US012472359B2

(12) United States Patent
Tsukada et al.

(10) Patent No.: US 12,472,359 B2
(45) Date of Patent: Nov. 18, 2025

(54) BIOLOGICAL ELECTRODE AND CARDIAC PACEMAKER

(71) Applicant: NTT, Inc., Tokyo (JP)

(72) Inventors: Shingo Tsukada, Musashino (JP); Tetsuhiko Teshima, Musashino (JP); Hiroshi Nakashima, Musashino (JP)

(73) Assignee: NTT, Inc., Tokyo (JP)

( * ) Notice: Subject to any disclaimer, the term of this patent is extended or adjusted under 35 U.S.C. 154(b) by 602 days.

(21) Appl. No.: 17/770,243

(22) PCT Filed: Oct. 29, 2019

(86) PCT No.: PCT/JP2019/042387
§ 371 (c)(1),
(2) Date: Apr. 19, 2022

(87) PCT Pub. No.: WO2021/084619
PCT Pub. Date: May 6, 2021

(65) Prior Publication Data
US 2022/0379111 A1    Dec. 1, 2022

(51) Int. Cl.
*A61N 1/362*    (2006.01)
*A61N 1/05*    (2006.01)
*D03D 1/00*    (2006.01)

(52) U.S. Cl.
CPC ........... *A61N 1/362* (2013.01); *A61N 1/0587* (2013.01); *D03D 1/0088* (2013.01)

(58) Field of Classification Search
CPC ........... A61B 5/256; A61B 5/268; A61B 5/27; A61B 2562/125; D03D 1/0088; A61N 1/0541; A61N 1/0587; A61N 1/0597; A61N 1/36038; A61N 1/362
See application file for complete search history.

(56) References Cited

U.S. PATENT DOCUMENTS

| | | | | |
|---|---|---|---|---|
| 5,554,179 A | * | 9/1996 | Stroetmann | A61N 1/05 607/121 |
| 2006/0183989 A1 | * | 8/2006 | Healy | A61B 5/24 607/152 |
| 2008/0097280 A1 | * | 4/2008 | Martin | A61K 9/0009 604/21 |
| 2011/0093029 A1 | * | 4/2011 | Takata | A61N 1/36114 607/14 |
| 2018/0280690 A1 | * | 10/2018 | Kim | A61L 31/146 |
| 2019/0088382 A1 | * | 3/2019 | Allen | B82Y 40/00 |

OTHER PUBLICATIONS

Y.B. Benovitski et al., "Ring and Peg Electrodes for Minimally-Invasive and Long-Term Sub-scalp EEG Recordings", Epilepsy research, Jun. 2017, 135: 29-37.

* cited by examiner

Primary Examiner — Jennifer Pitrak McDonald
Assistant Examiner — Shreya Anjaria (57) ABSTRACT

The present biological electrode includes a conductive fabric (2) formed of base fibers which are filled with a conductor and/or to which the conductor is adhered, a thin metallic wire (3) formed into a spiral shape and connected with the conductive fabric (2) at a distal end of the thin metallic wire, and a filling material (5) with which a gap between the conductive fabric (2) and the thin metallic wire (3) is filled and which supports the conductive fabric (2) and the thin metallic wire (3), the conductive fabric (2) is supported in a roll shape, and the conductor is electrically connected with the thin metallic wire (3).

7 Claims, 8 Drawing Sheets

BIOLOGICAL ELECTRODE AND CARDIAC PACEMAKER

CROSS-REFERENCE TO RELATED APPLICATIONS

This application is a 371 U.S. National Phase of International Application No. PCT/JP2019/042387 filed on Oct. 29, 2019. The entire disclosure of the above application is incorporated herein by reference.

TECHNICAL FIELD

The present invention relates to a biological electrode and a cardiac pacemaker.

BACKGROUND ART

In related art, in order to receive an electric signal accurately and efficiently in a living body at an external device and conversely to transmit an electric signal from an external device into a living body, a biologically implanted biological electrode has been used.

A biologically implanted biological electrode has widely been used for a cardiac pacemaker, a cochlear implant, and so forth. Further, as a future human interface, development of a brain-machine interface and so forth using an implanted biological electrode has been progressing.

As an example of a biologically implanted biological electrode, Non-Patent Literature 1 discloses a biological electrode in which an electrode portion is in a peg or ring shape.

CITATION LIST

Non-Patent Literature

Non-Patent Literature 1: Benovitsk et al., "Ring and peg electrodes for minimally-Invasive and long-term sub-scalp EEG recordings", Epilepsy Res. 2017 135: 29-37.

SUMMARY OF THE INVENTION

Technical Problem

However, a problem is that in a case where an electrode portion is made of hard metal such as stainless steel, a pressure is applied to a biological tissue due to contact with the electrode portion, and a wearer of the electrode is thereby caused to experience discomfort.

In consideration of the above situation, an object of the present invention is to provide a biological electrode that can reduce a pressure applied to a biological tissue and can maintain a function of an electrode even when being worn.

Means for Solving the Problem

One aspect of the present invention provides a biological electrode including: a conductive fabric formed of base fibers which are filled with a conductor and/or to which the conductor is adhered; a thin metallic wire formed into a spiral shape and connected with the conductive fabric at a distal end of the thin metallic wire; and a filling material with which a gap between the conductive fabric and the thin metallic wire is filled and configured to support the conductive fabric and the thin metallic wire, in which the conductive fabric is supported in a roll shape and the conductor is electrically connected with the thin metallic wire.

Effects of the Invention

The above biological electrode can provide a biological electrode that can reduce a pressure applied to a biological tissue and can maintain a function of an electrode even when being worn.

DESCRIPTION OF EMBODIMENTS

A first embodiment of the present invention will be described with reference to FIG. 1 to FIG. 5.

Figure 1:
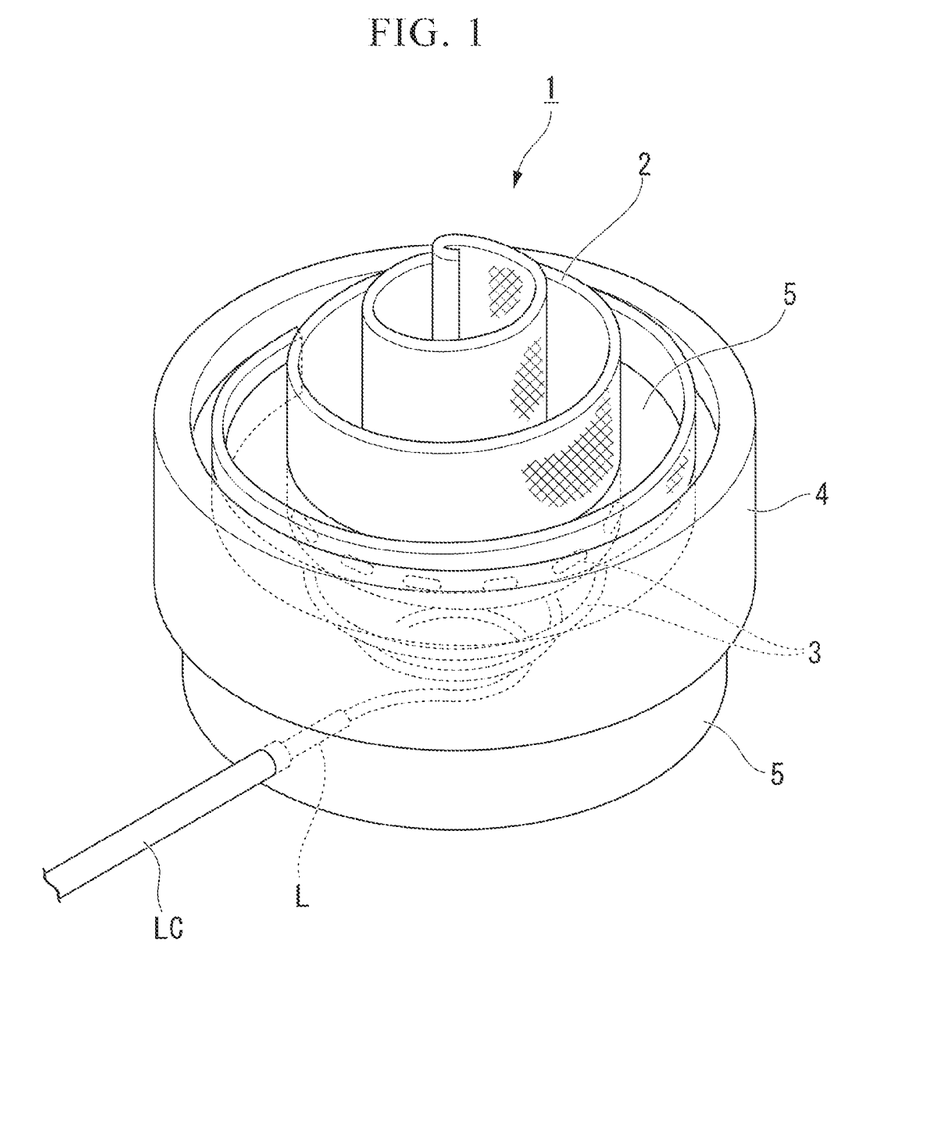
FIG. 1 is a perspective view of a biological electrode according to a first embodiment of the present invention.

A biological electrode 1 according to the present embodiment is an electrode used for sensing and so forth (including sensing, pacing, and transmission and reception of an electric signal) in a cardiac pacemaker, a cochlear implant, a brain-machine interface, or the like, for example. That is, the biological electrode 1 according to the present embodiment may be used for a cardiac pacemaker, a cochlear implant, a brain-machine interface, or the like. The biological electrode 1 according to the present embodiment may be used for a device performing sensing and so forth of a biological organ which expands and contracts such as a heart or a skeletal muscle.

Figure 2:
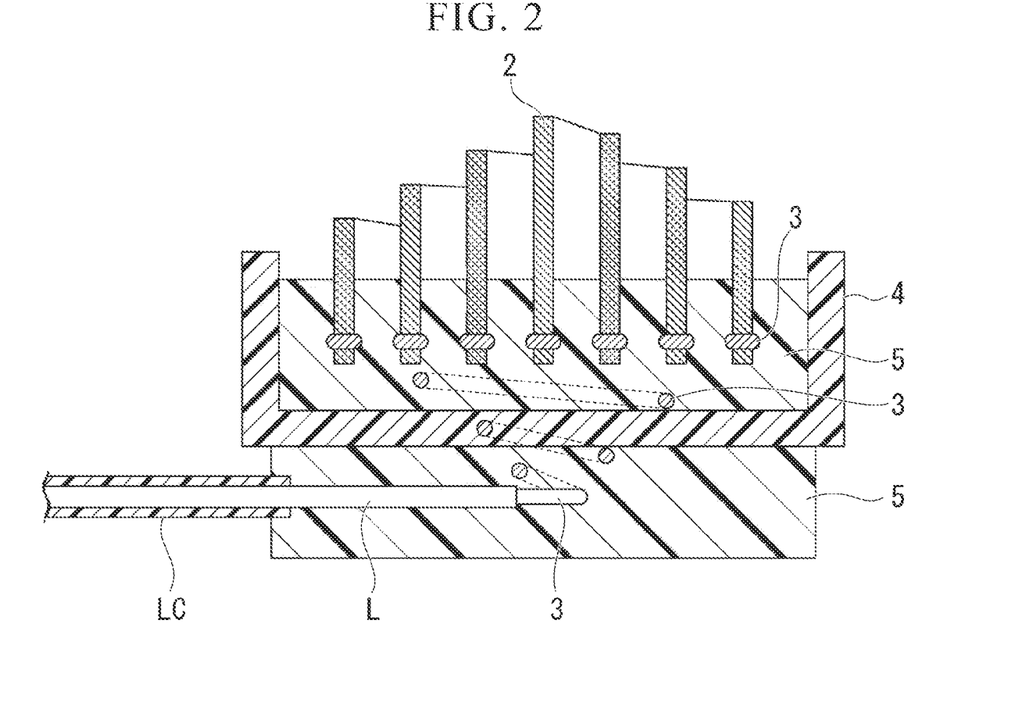
FIG. 2 is a cross-sectional view of the biological electrode according to the first embodiment of the present invention.

As illustrated in FIG. 1 and FIG. 2, the biological electrode 1 includes a conductive fabric 2, a thin metallic wire 3, a pedestal 4, and a filling material 5.

The conductive fabric 2 is formed of base fibers which are filled with a conductor containing conductive polymers and/or to which the conductor is adhered. Conductive polymers are used as the conductor, and the rigidity of the conductive fabric 2 can be made lower than a case where a metal material is used as the conductor. The conductive fabric 2 is supported in a roll shape.

Figure 3:
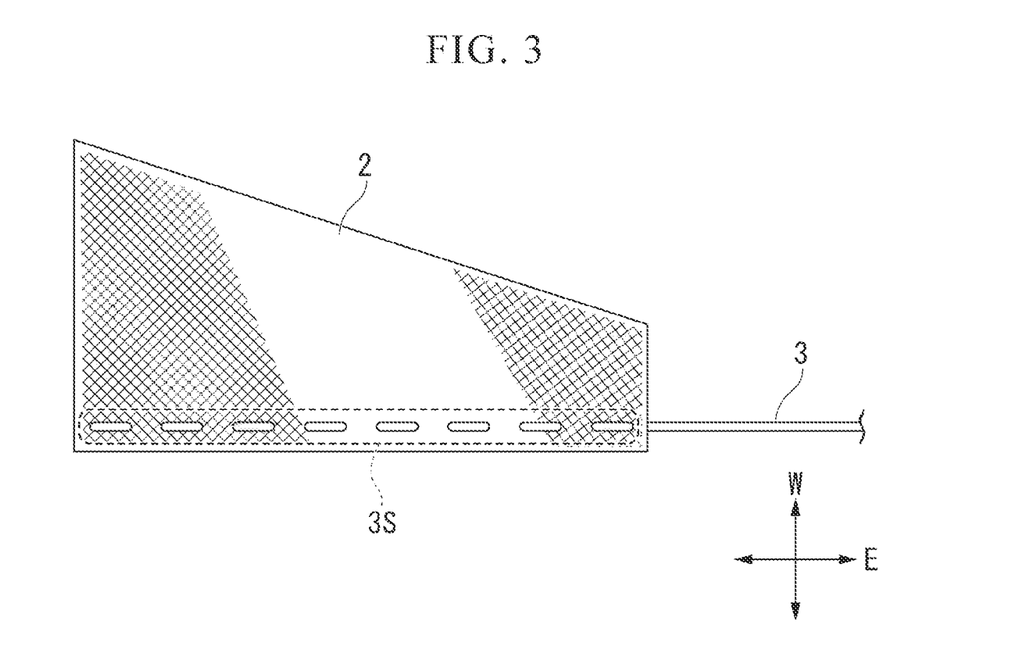
FIG. 3 is a diagram illustrating a conductive fabric and a thin metallic wire according to the first embodiment of the present invention which are unfolded.

As illustrated in FIG. 3, in the present embodiment, the unfolded conductive fabric 2 has a generally trapezoidal shape but may have a quadrangular shape, another polygonal shape, a circular shape, or the like as long as the shape has a certain surface area.

The conductive fabric 2 is formed such that the dimension in a length direction E is on the order of 20 mm. The conductive fabric 2 is formed such that the dimension in a width direction W orthogonal to the length direction E of the conductive fabric 2 is on the order of 3 mm to 4 mm in the largest portion and is on the order of 2 mm to 3.5 mm in the smallest portion.

A formation method of the conductive fabric 2 may be formation by knitting, formation by weaving, formation as a non-woven fabric, using one kind of those, or using a combination of two or more kinds of those.

As the conductive polymers used for the conductive fabric 2, a polythiophene-based conductive polymer such as PEDOT-PSS {poly(3,4-ethylenedioxythiophene)-poly(styrene sulfonate)}, polyacetylene-based, polyaniline-based, and polypyrrole-based conductive polymers, and so forth are used.

The conductor used for the conductive fabric 2 may contain an additive other than the conductive polymers. As additives, for example, glycerol, sorbitol, polyethylene glycol-polypropylene glycol copolymer, ethylene glycol, sphingosine, phosphatidylcholine, and so forth are raised. The additive contained in the conductor may be one kind, or two or more kinds may be used in combination.

The additives of the above examples can be used for the purpose of adjusting wetting characteristics of the conductive fabric 2 or can be used, by giving flexibility, for the purpose of improving affinity for a biological tissue (skin or tissue) in use as the biological electrode.

Note that as specific examples of adjustment of the wetting characteristics, for example, adjustment of water absorbency, prevention of excessive swelling or shrinkage in moistening or drying, and so forth are raised.

As the base fibers used for the conductive fabric 2, animal fibers such as silk and animal hairs, vegetable fibers such as cotton and hemp, synthetic fibers formed of nylon, polyester, acrylic resin, polyvinyl chloride, polyurethane, and so forth, mixed-spun fibers and regenerated fibers of those, and so forth are used.

As a method for filling the base fibers with the conductor or adhering conductor to the base fibers, a method of filling gaps of the base fibers with the conductor, a method of covering the base fibers by the conductor, a method of intertwining the base fibers with the conductor formed into a fiber-like state, or a method of combining those together can be applied.

Polythiophene-based, polyacetylene-based, polyaniline-based, and polypyrrole-based conductive polymers have excellent conductivity and hydrophilicity. PEDOT-PSS as one kind of polythiophene-based conductive polymer particularly has excellent conductivity, hydrophilicity, and biocompatibility and have excellent adhesiveness to synthetic fibers of silk, polyester, and so forth. Consequently, the conductive fabric 2 using PEDOT-PSS as the conductive polymers and using synthetic fibers of silk, polyester, and so forth as the base fibers have excellent biocompatibility, conductivity, flexibility, and strength together.

As the thin metallic wire 3, a material having high biocompatibility is used, and for example, a platinum-iridium alloy, platinum, gold, titanium, silver, a cobalt alloy, a nickel alloy, carbon fiber, stainless steel, or the like is used.

A distal end side of the thin metallic wire 3 is connected with the conductive fabric 2. A base end side of the thin metallic wire 3 is formed into a spiral shape and has a spring-shaped structure. A base end of the thin metallic wire 3 is connected with a lead wire L of a cardiac pacemaker or the like, for example. The thin metallic wire 3 and the lead wire L are connected together by using a crimping sleeve or the like, for example.

In order to secure durability, reliability, and safety, a similar material to the thin metallic wire 3 is preferably used for the lead wire L, and the lead wire L is preferably formed into a coil shape or a twisted wire shape.

As illustrated in FIG. 3, the conductive fabric 2 has a sewn portion 3S which the distal end side of the thin metallic wire 3 is generally linearly sewn into along the length direction E and the thin metallic wire 3 is thereby connected with. A distal end of the thin metallic wire 3 is fixed to the conductive fabric 2 by bending, tying, caulking, or the like.

Note that in the present embodiment, the base fibers are connected with the thin metallic wire 3, and the base fibers are thereafter filled with the conductor. Thus, the conductor is fused with the thin metallic wire 3 at the same time as formation of the conductive fabric 2. The thin metallic wire 3 is fused with the conductor, and the conductivity of the biological electrode 1 is thereby improved.

The conductive fabric 2 is wound up along the sewn portion 3S and thereby has a roll shape. Thus, as illustrated in FIG. 1, the thin metallic wire 3 has a whorled shape in the sewn portion 3S. The thin metallic wire 3 is sewn into the conductive fabric 2 and is wound up together with the conductive fabric 2, and the thin metallic wire 3 thereby closely contacts with the conductor with which the base fibers with an increased density are filled and/or which is adhered to the base fibers with an increased density.

In the present embodiment, the width of the conductive fabric 2 from the sewn portion 3S becomes largest at a distal end of the sewn portion 3S, and the width of the conductive fabric 2 from the sewn portion 3S gradually becomes smaller toward a base end of the sewn portion 3S. Thus, the conductive fabric 2 is wound up around the distal end of the sewn portion 3S as a center along the sewn portion 3S, and a protruding shape is thereby formed in which a central portion of the conductive fabric 2 is elevated.

In the present embodiment, the conductive fabric 2 is wound up around, as the center, the distal end side of the sewn portion 3S on which the width of the conductive fabric 2 from the sewn portion 3S becomes largest; however, the width of the conductive fabric 2 from the sewn portion 3S may be made largest on the base end side of the sewn portion 3S, and the conductive fabric 2 may be wound up around the base end side of the sewn portion 3S as the center.

The pedestal 4 has a general saucer shape having a recess on the conductive fabric 2 side. As a material of the pedestal 4, a silicone material such as PDMS (polydimethylsiloxane) is used.

The pedestal 4 is formed to have a thickness of approximately 1 mm. The recess of the pedestal 4 is formed to have a diameter of approximately 4 mm and a depth of approximately 2 mm. Further, the conductive fabric 2 is arranged to be exposed from the recess of the pedestal 4, and the pedestal 4 is formed such that the height of the conductive fabric 2 exposed from the recess of the pedestal 4 falls in a range of approximately 0.5 mm to 2 mm.

The pedestal 4 is provided between the distal end and the base end of the thin metallic wire 3, and the thin metallic wire 3 passes through the pedestal 4.

Gaps among the conductive fabric 2, the thin metallic wire 3, the pedestal 4, and the lead wire L are filled with the filling material 5, and the filling material 5 configured to support the conductive fabric 2, the thin metallic wire 3, the pedestal 4, and the lead wire L. As the filling material 5, a silicone material such as PDMS is used.

Figure 4:
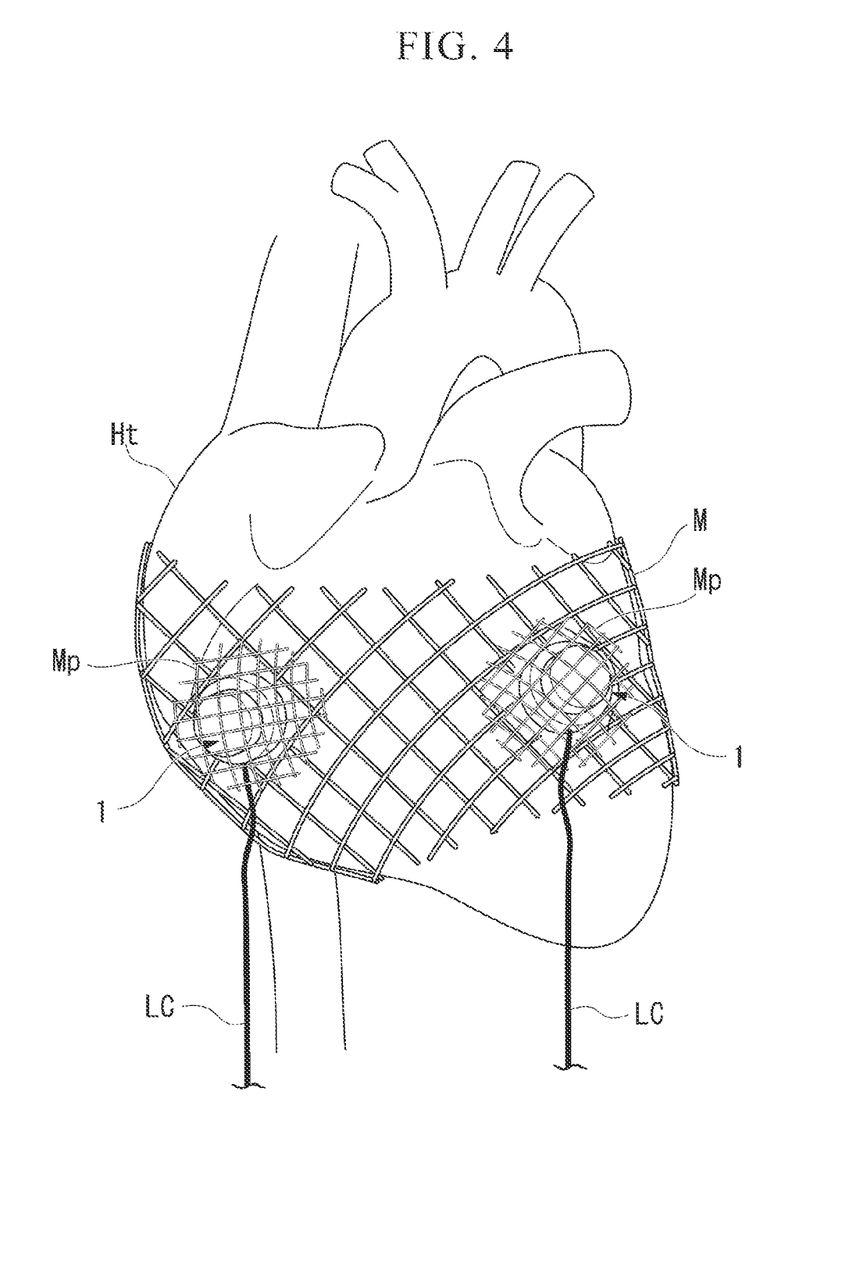
FIG. 4 is a diagram illustrating a case where the biological electrode according to the first embodiment of the present invention is installed as a cardiac pacemaker.

Next, an action of the biological electrode 1 will be described. As illustrated in FIG. 4, the biological electrode 1 is inserted in a pocket Mp formed in a mesh M mounted on an installation target part of the biological electrode 1 and thereby installed, for example. As a material of the mesh M, polyester, silk, or the like is used. The biological electrode 1 used as an anode and the biological electrode 1 used as a cathode are installed.

Figure 5:
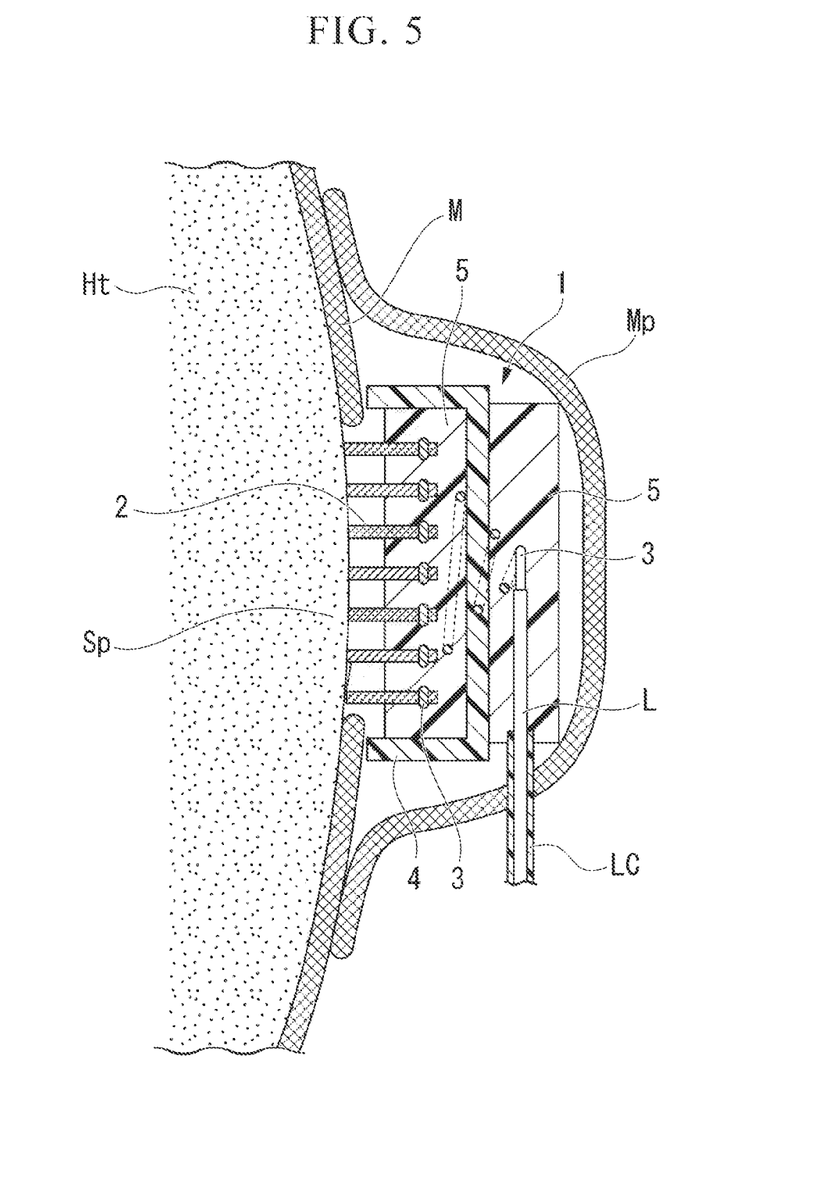
FIG. 5 is a cross-sectional view of the biological electrode according to the first embodiment of the present invention which is installed.

As illustrated in FIG. 5, the biological electrode 1 is installed such that the conductive fabric 2 contacts with a sensing-and-so-forth target part Sp.

The biological electrode 1 is installed such that an axis direction of the thin metallic wire 3 generally agrees with an expansion-contraction direction of transformation of the sensing-and-so-forth target part Sp by a pulse.

The biological electrode 1 is installed in such a manner, and the sensing-and-so-forth target part Sp is electrically connected with the conductive fabric 2, the thin metallic wire 3, and the lead wire L which have conductivity.

The biological electrode 1 contacts with the sensing-and-so-forth target part Sp via the conductive fabric 2 which has flexibility by using fibers as a base material. The thin metallic wire 3 formed into a spiral shape and having a spring-shaped structure is arranged between the sensing-and-so-forth target part Sp and the lead wire L and buffers pressures received from the lead wire L due to pulsation of the sensing-and-so-forth target part Sp.

The biological electrode 1 having the above configuration is installed such that the conductive fabric 2 having flexibility and conductivity contacts with the sensing-and-so-forth target part Sp. Further, in the biological electrode 1, the conductive fabric 2 portion is connected with the lead wire L via the thin metallic wire 3 formed into the spiral shape and having the spring-shaped structure. Thus, the biological electrode 1 contacts with the sensing-and-so-forth target part Sp while having proper buffering characteristics against transformation of the sensing-and-so-forth target part Sp which accompanies a pulse and can reduce a pressure exerted on a biological tissue.

In the biological electrode 1, the base fibers of the conductive fabric 2 to contact with the sensing-and-so-forth target part Sp are filled with the conductor, and/or the conductor is adhered to the base fibers, the conductor is distributed to the whole conductive fabric 2, and the biological electrode 1 can thus maintain a function of an electrode even when being worn. In the biological electrode 1, the conductive fabric 2 is supported in a roll shape while a portion in which the width of the conductive fabric 2 is largest is set as the center and has a protruding shape in which its central portion is elevated, the protruding shape contacts with the sensing-and-so-forth target part Sp, and a contact state is thus stabilized.

Because the thin metallic wire 3 of the biological electrode 1 has the spring-shaped structure which is generally coaxial with the direction of transformation of the sensing-and-so-forth target part Sp which accompanies a pulse, a stress produced by a pulse is not concentrated into a specific portion but is dispersed, and fracture and wire breakage are less likely to occur.

Further, the biological electrode 1 is integrally formed by filling the gaps among the conductive fabric 2, the thin metallic wire 3, and the lead wire L with the filling material 5 using a silicone material. Thus, the biological electrode 1 has flexibility and can endure a mechanical stress in installation. In addition, the conductive fabric 2 of the biological electrode 1 draws the filling material 5 by capillary action in filling with the filling material 5. A space between the conductive fabric 2 and the thin metallic wire 3 is filled up with the filling material 5 drawn toward the conductive fabric 2, and insulation between the conductive fabric 2 and the thin metallic wire 3 is thereby enhanced. The insulation between the conductive fabric 2 and the thin metallic wire 3 is enhanced, a spreading amount of a current flowing through the conductive fabric 2 into body fluids is thereby regulated, and loss of current is reduced.

Next, a second embodiment of the present invention will be described with reference to FIG. 6 to FIG. 9.

Figure 6:
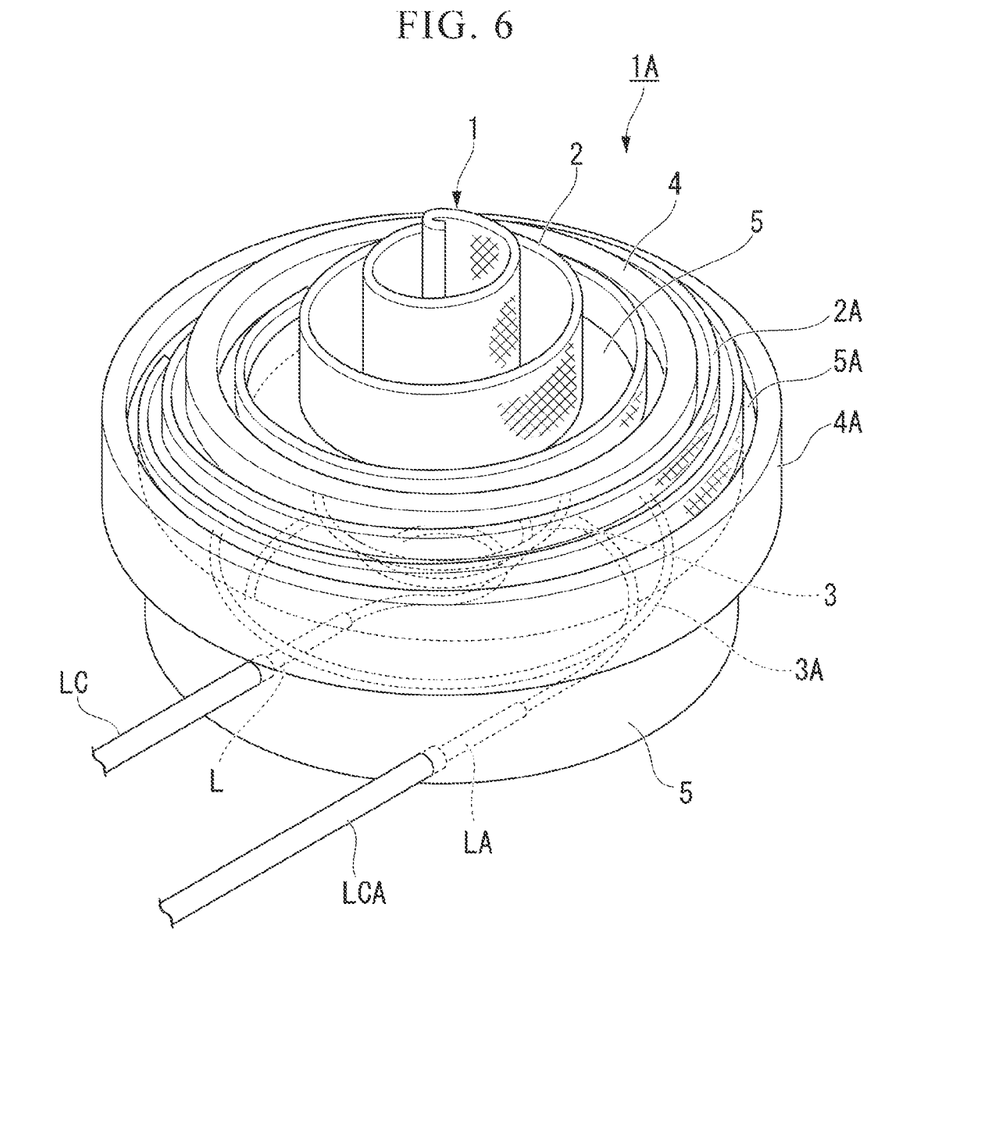
FIG. 6 is a perspective view of a biological electrode according to a second embodiment of the present invention.

Similarly to the biological electrode 1, a biological electrode 1A according to the present embodiment is an electrode used for sensing and so forth (including sensing, pacing, and transmission and reception of an electric signal) in a cardiac pacemaker, a cochlear implant, a brain-machine interface, or the like, for example. That is, the biological electrode 1 according to the present embodiment may be used for a cardiac pacemaker.

Figure 7:
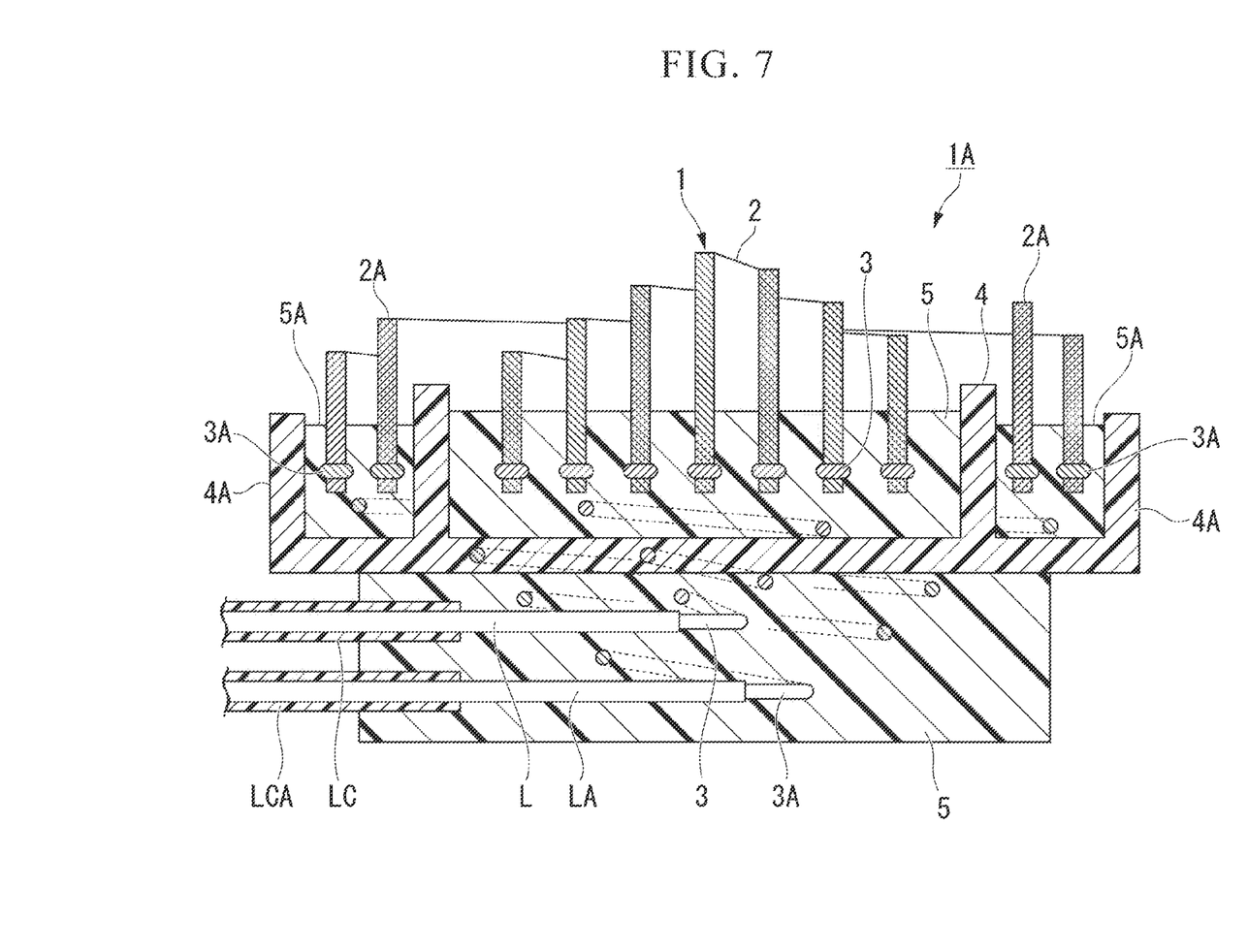
FIG. 7 is a cross-sectional view of the biological electrode according to the second embodiment of the present invention.

As illustrated in FIG. 6 and FIG. 7, in addition to the configuration of the biological electrode 1, the biological electrode 1A includes a conductive fabric 2A, a thin metallic wire 3A, a pedestal 4A, and a filling material 5A which are arranged to surround the biological electrode 1. The relationship among the conductive fabric 2A, the thin metallic wire 3A, the pedestal 4A, and the filling material 5A is similar to the relationship among the conductive fabric 2, the thin metallic wire 3, the pedestal 4, and the filling material 5.

A configuration of the conductive fabric 2A is similar to the conductive fabric 2. The conductive fabric 2A is wound to surround an outer periphery of the pedestal 4 of the biological electrode 1.

A configuration of the thin metallic wire 3A is similar to the thin metallic wire 3. A base end of the thin metallic wire 3A is connected with a lead wire LA of a cardiac pacemaker or the like, for example. The thin metallic wire 3A and the lead wire LA are connected together by using a crimping sleeve or the like, for example.

In order to secure durability, reliability, and safety, a similar material to the thin metallic wire 3A is preferably used for the lead wire LA, and the lead wire LA is preferably formed into a coil shape or a twisted wire shape.

A bottom surface of the pedestal 4A is generally flush with a bottom surface of the pedestal 4. An inner periphery of the pedestal 4A and the outer periphery of the pedestal 4 are formed such that the distance therebetween is approximately 1 mm. A recess of the pedestal 4A is formed to have a depth of approximately 1.35 mm. Further, the conductive fabric 2A as arranged to be exposed from the recess of the pedestal 4A, and the pedestal 4A is formed such that the height of the conductive fabric 2 exposed from the recess of the pedestal 4A falls in a range of approximately 0.5 mm to 2 mm.

As a material of the pedestal 4A, a silicone material such as PDMS (polydimethylsiloxane) is used. The pedestal 4A is provided between a distal end and the base end of the thin metallic wire 3A, and the thin metallic wire 3A passes through the pedestal 4A.

A configuration of the filling material 5A is similar to the filling material 5. Gaps among the conductive fabric 2A, the thin metallic wire 3A, and the pedestal 4A are filled with the filling material 5A, and the filling material 5A configured to support the conductive fabric 2A, the thin metallic wire 3A, and the pedestal 4A.

On the base end side of the thin metallic wire 3A relative to the pedestal 4A, gaps among the thin metallic wire 3A, the pedestal 4A, and the lead wire LA are filled with the filling material 5, and the filling material 5 supports the thin metallic wire 3A, the pedestal 4A, and the lead wire LA.

Figure 8:
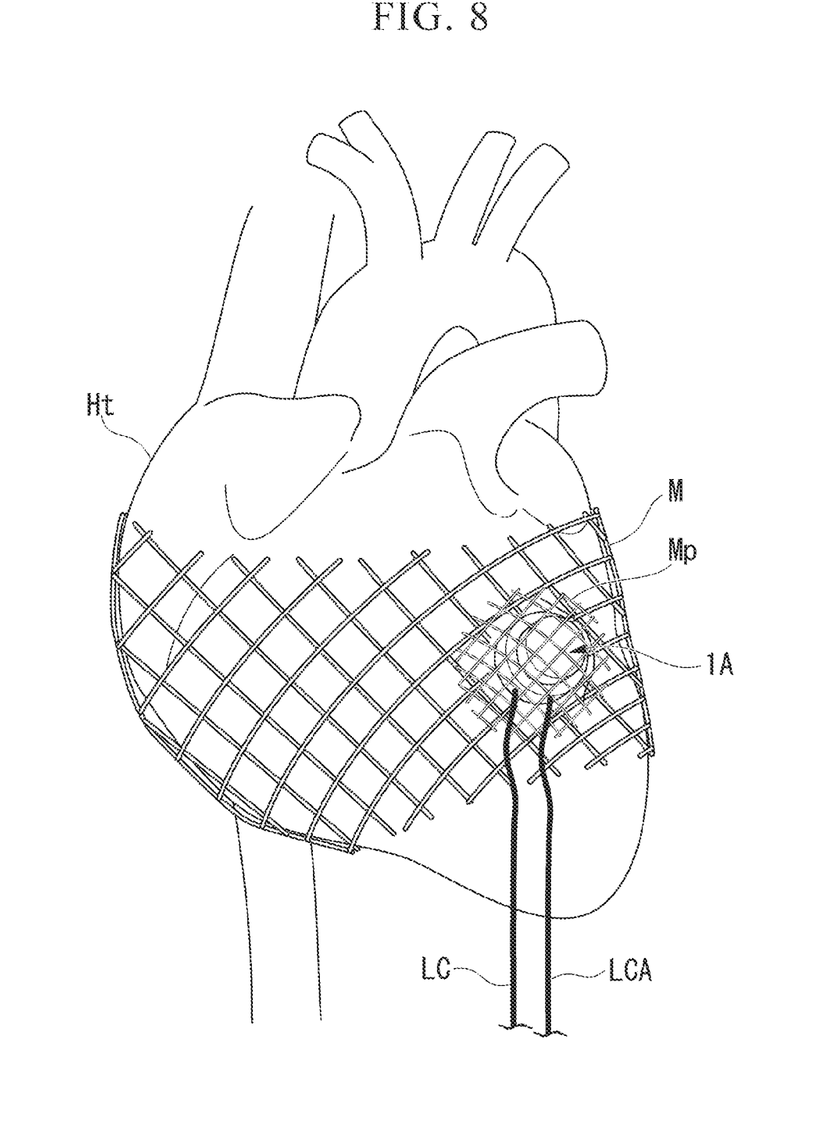
FIG. 8 is a diagram illustrating a case where the biological electrode according to the second embodiment of the present invention is installed as a cardiac pacemaker.

Next, an action of the biological electrode 1A will be described. As illustrated in FIG. 8, similarly to the biological electrode 1, the biological electrode 1A is inserted in the pocket Mp formed in the mesh M mounted on an installation target part of the biological electrode 1A and thereby installed, for example.

The conductive fabric 2, the thin metallic wire 3, and the lead wire L serve as one of an anode electrode and a cathode electrode, and the conductive fabric 2A, the thin metallic wire 3A, and the lead wire LA serve as the other of the cathode electrode and the anode electrode.

Figure 9:
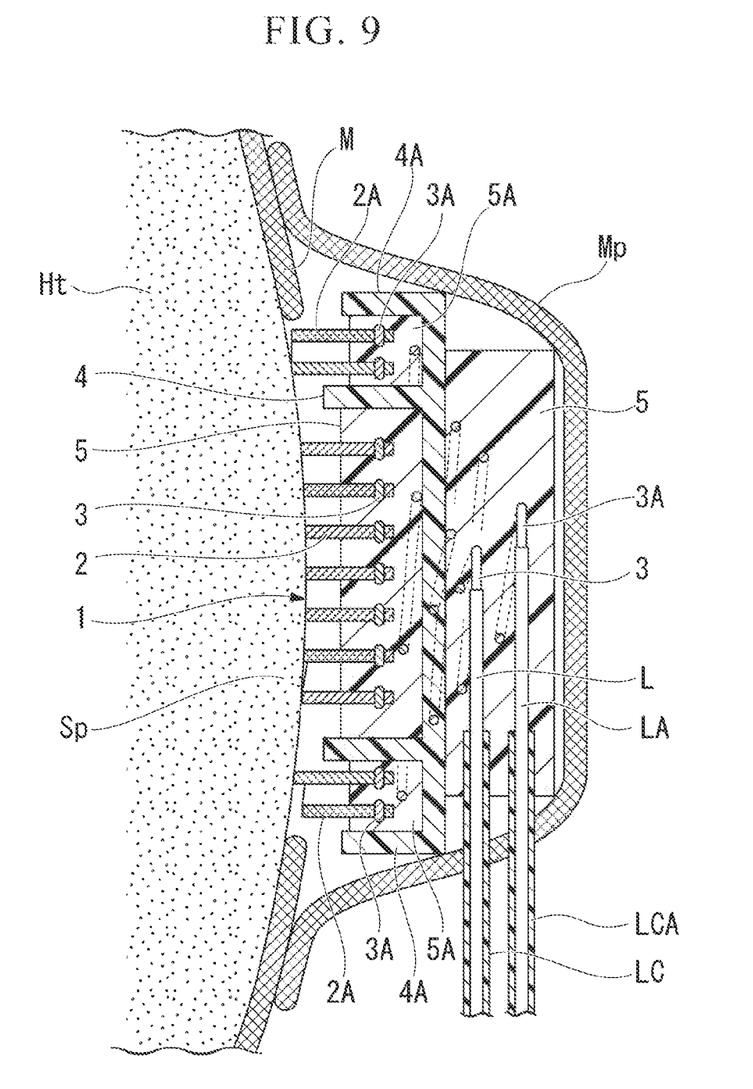
FIG. 9 is a cross-sectional view of the biological electrode according to the second embodiment of the present invention which is installed.

As illustrated in FIG. 9, the biological electrode 1A is installed such that the conductive fabric 2 and the conductive fabric 2A contact with the sensing-and-so-forth target part Sp.

The biological electrode 1A is installed such that axis directions of the thin metallic wire 3 and the thin metallic wire 3A generally agree with an expansion-contraction direction of transformation of the sensing-and-so-forth target part Sp by a pulse.

The biological electrode 1A is installed in such a manner, and the sensing-and-so-forth target part Sp is electrically connected with the conductive fabric 2, the thin metallic wire 3, and the lead wire L which have conductivity. Further, the sensing-and-so-forth target part Sp is electrically connected with the conductive fabric 2A, the thin metallic wire 3A, and the lead wire LA which have conductivity.

The biological electrode 1A contacts with the sensing-and-so-forth target part Sp via the conductive fabric 2 and the conductive fabric 2A which have flexibility by using fibers as a base material. The thin metallic wire 3 and the thin metallic wire 3A which are formed into spiral shapes and have spring-shaped structures are arranged between the sensing-and-so-forth target part Sp and the lead wire L and lead wire LA and buffer pressures received from the lead wire L and lead wire LA due to pulsation of the sensing-and-so-forth target part Sp.

The biological electrode 1A having the above configuration is installed such that the conductive fabric 2 and the conductive fabric 2A which have flexibility and conductivity contact with the sensing-and-so-forth target part Sp. Further, in the biological electrode 1A, the conductive fabric 2 portion and the conductive fabric 2A portion are connected with the lead wire L and the lead wire LA via the thin metallic wire 3 and the thin metallic wire 3A which are formed into the spiral shapes and have the spring-shaped structures. Thus, the biological electrode 1A contacts with the sensing-and-so-forth target part Sp while having proper buffering characteristics against transformation of the sensing-and-so-forth target part Sp which accompanies a pulse and can reduce a pressure exerted on a biological tissue.

In the biological electrode 1A, the base fibers of the conductive fabric 2 and the conductive fabric 2A which contact with the sensing-and-so-forth target part Sp are filled with the conductor, and/or the conductor is adhered to the base fibers, and the conductor is distributed to the whole conductive fabric 2 and the whole conductive fabric 2A. Thus, the biological electrode 1A can maintain a function of an electrode even when being worn. In the biological electrode 1A, the conductive fabric 2 and the conductive fabric 2A are supported in roll shapes while portions in which the widths of the conductive fabric 2 and the conductive fabric 2A are largest are set as the centers and have protruding shapes in which their central portions are elevated, the protruding shapes contact with the sensing-and-so-forth target part Sp, and a contact state is thus stabilized.

Because the thin metallic wire 3 and the thin metallic ware 3A of the biological electrode 1A have the spring-shaped structures which are generally coaxial with the direction of transformation of the sensing-and-so-forth target part Sp which accompanies a pulse, a stress produced by a pulse is not concentrated into a specific portion but is dispersed, and fracture and wire breakage are less likely to occur.

Further, the biological electrode 1A is integrally formed by filling the gaps among the conductive fabric 2, the thin metallic wire 3, and the lead wire L and the gaps among the conductive fabric 2A, the thin metallic wire 3A, and the lead wire LA with the filling material 5 and the filling material 5A which use a silicone material. Thus, the biological electrode 1A has flexibility and can endure a mechanical stress in installation. In addition, the conductive fabric 2 and the conductive fabric 2A of the biological electrode 1A draw the filling material 5 and the filling material 5A by capillary action in filling with the filling material 5 and the filling material 5A. The space between the conductive fabric 2 and the thin metallic wire 3 and a space between the conductive fabric 2A and the thin metallic wire 3A are filled up with the filling material 5 and the filling material 5A which are drawn toward the conductive fabric 2 and the conductive fabric 2A. Thus, the insulation between the conductive fabric 2 and the thin metallic wire 3 and insulation between the conductive fabric 2A and the thin metallic wire 3A are enhanced. The insulation between the conductive fabric 2 and the thin metallic wire 3 and the insulation between the conductive fabric 2A and the thin metallic wire 3A are enhanced, spreading amounts of currents flowing through the conductive fabric 2 and the conductive fabric 2A into body fluids are thereby regulated, and loss of current is reduced.

In the foregoing, the embodiments of the present invention have been described with reference to the drawings. However, specific configurations are not limited to those embodiments, and the present invention includes design changes and so forth made without departing from the scope of the gist of the present invention. Further, it is possible to make configurations by appropriately combining configuration elements which are described in the above-described embodiments and modification examples described in the following.

For example, the conductive fabric 2 or the conductive fabric 2A is formed by filling the base fibers with the conductor or adhering the conductor to the base fibers, connection between the conductive fabric 2 and the thin metallic wire 3 or connection between the conductive fabric 2A and the thin metallic wire 3A is thereafter performed, the conductor is fused with the thin metallic wire 3 or the thin metallic wire 3A, and the biological electrode 1 or the biological electrode 1A may thereby be formed.

In the biological electrode 1 or the biological electrode 1A, instead of the thin metallic wire 3 or the thin metallic wire 3A, a conductor formed into a string shape may be used.

In the biological electrode 1 or the biological electrode 1A, the thin metallic wire 3 or the thin metallic wire 3A may be exposed from the filling material 5. In such a case, a portion of the thin metallic wire 3 or the thin metallic wire 3A is covered, the portion being exposed from the filling material 5.

As long as a shape can be retained only by the filling material 5 or the filling material 5A, the biological electrode 1 or the biological electrode 1A may not have to include the pedestal 4 or the pedestal 4A.

The conductive fabric 2 or the conductive fabric 2A of the biological electrode 1 or the biological electrode 1A may be wound up around a portion with the smallest width as a center in accordance with the shape of the sensing-and-so-forth target part Sp.

The thin metallic wire 3 or the thin metallic wire 3A of the biological electrode 1 or the biological electrode 1A may not have to be sewn as long as the thin metallic wire 3 or the thin metallic wire 3A is connected with the conductive fabric 2 or the conductive fabric 2A.

In the biological electrode 1 or the biological electrode 1A, the conductive polymers may not have to be contained in the conductor.

In the biological electrode 1 or the biological electrode 1A, the conductor may not have to be fused with the thin metallic wire 3 as long as the conductor and the thin metallic wire 3 are electrically connected together.

REFERENCE SIGNS LIST 1, 1A biological electrode
2, 2A conductive fabric
3, 3A thin metallic wire
3S sewn portion
4, 4A pedestal
5, 5A filling material
Ht heart
L, LA lead
LC, LCA cover
M mesh
Mp pocket
Sp sensing-and-so-forth target part

The invention claimed is:

1. A biological electrode comprising:
a conductive fabric formed of base fibers which are filled with a conductor and/or to which the conductor is adhered;
a thin metallic wire formed into a spiral shape and connected with the conductive fabric at a distal end of the thin metallic wire; and
a filling material with which a gap between the conductive fabric and the thin metallic wire is filled and configured to support the conductive fabric and the thin metallic wire, wherein the conductive fabric is supported in a roll shape, and the conductor is a conducting polymer electrically connected with the thin metallic wire.

2. The biological electrode according to claim 1, wherein the thin metallic wire has a sewn portion in which a side of the distal end is generally linearly sewn into the conductive fabric,
a width of the conductive fabric, the width being orthogonal to the sewn portion, gradually becomes larger from a base end to a distal end of the sewn portion, and the conductive fabric is formed into a roll shape around the distal end of the sewn portion as a center along the sewn portion.

3. The biological electrode according to claim 1, wherein the conductive polymers contain any of polythiophene-based, polyacetylene-based, polyaniline-based, and polypyrrole-based conductive polymers.

4. The biological electrode according to claim 1, further comprising
a pedestal that is formed between the distal end and a base end of the thin metallic wire and configured to support the conductive fabric and the thin metallic wire.

5. The biological electrode according to claim 1, further comprising:
the conductive fabric and the thin metallic wire that are used as an anode; and
the conductive fabric and the thin metallic wire that are used as a cathode, wherein
the conductive fabric and the thin metallic wire that are used as the anode are insulated from the conductive fabric and the thin metallic wire that are used as the cathode by the filling material.

6. A cardiac pacemaker comprising the biological electrode according to claim 1.

7. The biological electrode according to claim 4, further comprising:
the conductive fabric and the thin metallic wire that are used as an anode; and
the conductive fabric and the thin metallic wire that are used as a cathode, wherein
the conductive fabric and the thin metallic wire that are used as the anode are insulated from the conductive fabric and the thin metallic wire that are used as the cathode by the filling material.

* * * * *